Dec. 16, 1941. W. LEATHERS Re. 21,978
VACUUM CLEANER
Original Filed Aug. 5, 1938
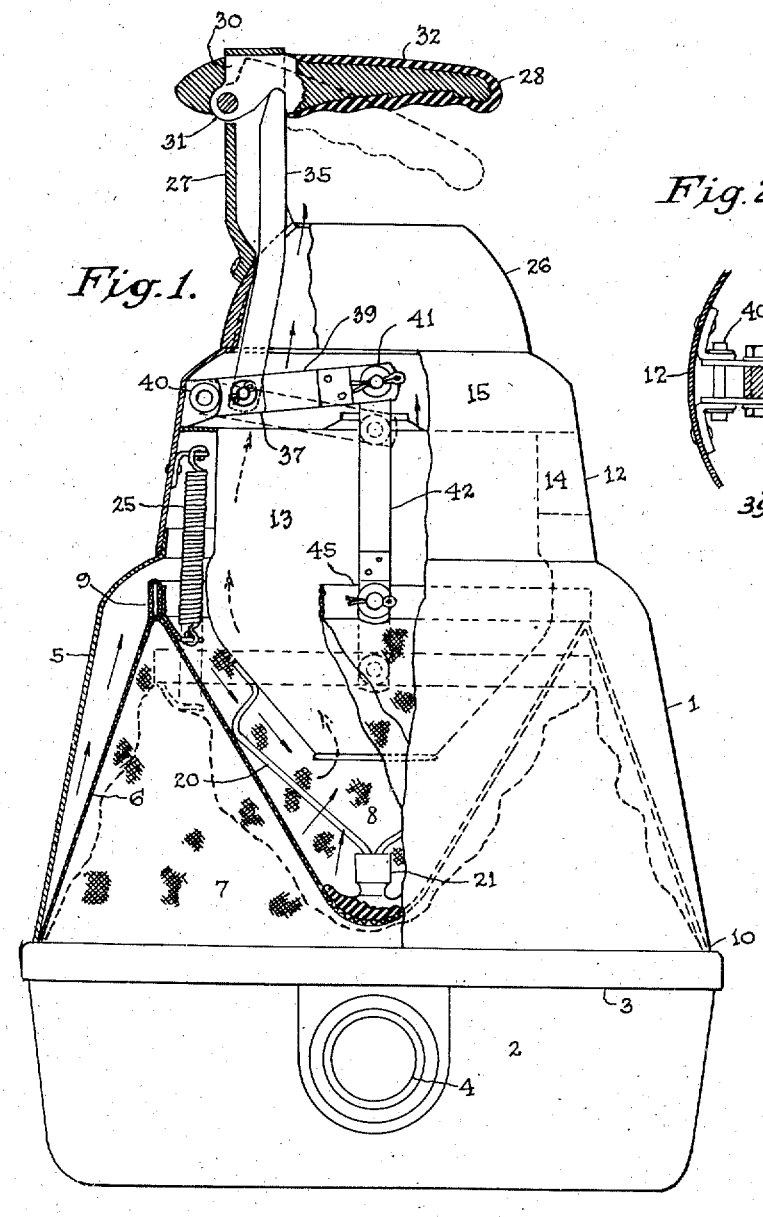
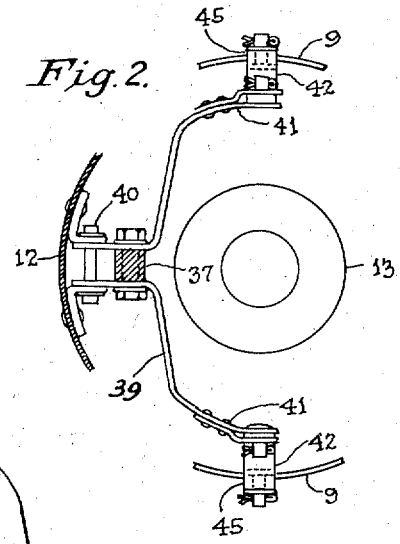
INVENTOR.
Wm. Leathers Reissued Dec. 16, 1941 Re. 21,978

UNITED STATES PATENT OFFICE 21,978

VACUUM CLEANER

Ward Leathers, Brooklyn, N. Y., assignor to Quadrex Corporation, New York, N. Y.

Original No. 2,192,357, dated March 5, 1940, Serial No. 223,261, August 5, 1938. Application for reissue December 24, 1940, Serial No. 371,602

12 Claims. (Cl. 183—58)

My invention pertains to canister-type vacuum-cleaners (that clean exclusively through a cleaning hose), and particularly to those having a vertical rather than a horizontal axis.

The object of my invention is to produce a light weight, compact machine of small bulk, especially for domestic use, having therein a "fixed" filter, i. e., one that is not removed for emptying dirt from the machine, together with a convenient and practical means of shaking such filter for keeping its perviosity at a high state of efficiency for filtering purposes.

Further objects will appear in the sub-joined specification and drawing, of which:

Figure 1 is a vertical elevation, partially cross-sectioned, of my vacuum-cleaner showing filter and shaker-mechanism.

Figure 2 is a plan view of a portion of the shaker-mechanism.

At the bottom of my vertical-axis, canister-type vacuum-cleaner 1 is disposed a dirt-receptacle 2 removable from the body of the machine along the horizontal line 3. The dirt-receptacle is provided with a hose attachment 4. The main body of the machine comprises three zones. The first zone comprises a shell 5 surrounding the filter 6 which is composed of two co-axial, conical sections 7 and 8, joined by a ring 9, preferably made of clock-spring. The filter may be joined to the ring in any desired manner as by sewing the fabric around it and is joined in an air-tight manner at its outer rim to the lower rim of the shell 5. The filter 6 is joined to the case 5 at its base 10. The second zone comprises a shell 12 supporting therein a motor-blower-unit 13 by means of rubber cushion segments 14 or other suitable means. For more complete description of this arrangement and construction see my co-pending application for Letters Patent No. 209,909, filed May 25, 1938. Above the motor-unit 13, within the casing 12, there is a chamber 15 in which various accessories may be suitably disposed. These may consist of motor switch, strain-relief for electric cord inlet, an opening for joining a blower-hose, preferably of smaller diameter than the cleaning hose, or indicators of the cleaning efficiency of the machine, such as set forth in my co-pending applications for Letters Patent Nos. 218,646 and 218,647, filed July 11, 1938. To the bottom of the casing of the motor-blower-unit 13 is attached a wire cage 20 for holding the filter free from contact with the blower case and used for the support of an inverted rubber mushroom 21 which holds the center of the filter in a free manner and in an approximately centralized location. A plurality, preferably two, of springs 25, having one end joined to the casing 12 and the other end joined to the filter ring 9, tend to hold the filter firmly in the position shown. The third zone consists of an open top cap or dome 26 from which the exhaust air escapes upward and the internal portion of which may be used for sound muffler, auxiliary filter or other purposes. To the dome 26 is firmly joined a hollow die-cast handle-post 27 which supports a free-end carrying-handle 28. A metal inner core 30 in the horizontal member of the carrying-handle is hinged to the post 27 at 31. The core 30 is covered with rubber 32. A push-rod 35 suitably socketed on the under side of the horizontal handle core 30 is joined at its lower end 37, in a hingeable manner, to a bow 39. The bow is hingeably joined to the case 12 at 40. The outer tips of the bow 41 are hingeably joined to push rods 42. The push rods 42 extend downward between the motor-blower-unit and the case 12 to which they are hingeably joined to the filter ring 9 as at 45. Between the motor-blower-unit 13 and the case 12 is a suitable packing or air resistor, not shown, or felt or other suitable material through which the push rods 42 pass in a free-moving but substantially air-tight manner.

When the filter requires shaking, preliminary to emptying the machine or on other occasions for improving the air-flow through the machine, the horizontal handle bar 28 is pressed downward and released as many times as is required. When this handle is pressed downward it depresses the bar 39 by means of the push-rod 35 which in turn depresses the filter ring 9 by means of the connecting rods 42, putting the filter in a loose position, as shown in dotted lines. When downward pressure on the handle is removed the filter is drawn upward to its taut position by the springs 25 and the handle 28 is raised to a horizontal position by the shaker-mechanism just described.

I claim:

1. In a vacuum-cleaner, a lower shell for receiving the accumulated dirt and having an air inlet, an upper shell joined to the lower shell along a continuous air-tight substantialy circular horizontal joint, said upper shell supporting therein a motor-driven-air-impelling-unit and having an air outlet for same, a conical reentrant filter with its base joined to the upper shell in an air-tight manner adjacent said horizontal joint, its fold joined to a stiff ring member and its downwardly projecting apex disposed substantially coaxially with both said shells and the said unit, and held by means depending from said motor-unit, with a substantial portion of said motor-unit disposed within said reentrant portion of said filter for holding said depending means, and with means for agitating the said ring for shaking the filter, said latter means joined to the side wall of said upper shell, and extending through said upper shell and having an external, manually operable handle.

2. In a vacuum-cleaner, a lower shell for receiving the accumulated dirt and having an air inlet, an upper shell joined to the lower shell along a continuous air-tight substantially circular horizontal joint, said upper shell supporting therein a motor-driven-air-impelling-unit and having an air outlet for same, a conical reentrant filter with its base joined to the upper shell in an air-tight manner adjacent said horizontal joint, its fold joined to a stiff ring member and its downwardly projecting apex disposed substantially co-axial with both said shells and the said unit, and held by means depending from said motor-unit, with a substantial portion of said motor-unit disposed within said reentrant portion of said filter for holding said depending means, and with means for agitating the said ring for shaking the filter, said means comprising a bow linked to said ring and attached in a hingeable manner to the side wall of said top shell, and having a member extending through said upper shell to a manually operable handle.

3. In a vacuum-cleaner, a lower shell for receiving the accumulated dirt and having an air inlet, an upper shell joined to the lower shell along a continuous air-tight substantially circular horizontal joint, said upper shell supporting therein a motor-driven-air-impelling-unit and having an air outlet for same, a conical reentrant filter with its base joined to the upper shell in an air-tight manner adjacent said horizontal joint, its fold joined to a stiff ring member and its downwardly projecting apex disposed substantially co-axial with both said shells and the said unit, and means for agitating the said ring for shaking the filter, said means comprising a bow operably related at its tips to said ring and attached in a hingeable manner to the side wall of said top shell and springs disposed within the upper shell for exerting energy upward on the filter.

4. In a vacuum-cleaner, a lower shell for receiving accumulated dirt and having an air inlet, an upper shell joined to the lower shell along a continuous air-tight, substantially circular, horizontal joint, said upper shell supporting therein a motor-driven-air-impelling-unit and having an air outlet for same, a conical reentrant filter with its base joined to the upper shell in an air-tight manner adjacent said horizontal joint, its fold joined to a stiff ring member and its downwardly projecting apex disposed substantially coaxially with both said shells and the said unit, an air inlet at the center and bottom of said motor-unit and with a substantial portion of said unit disposed within the said reentrant portion of said filter, and means interposed between said inlet and said filter for holding the filter free from said inlet.

5. In a vacuum-cleaner, a lower shell for receiving accumulated dirt and having an air inlet, an upper shell joined to the lower shell along a continuous air-tight, substantially circular, horizontal joint, said upper shell supporting therein a motor-driven-air-impelling-unit and having an air outlet for same, a conical reentrant filter with its base joined to the upper shell in an air-tight manner adjacent said horizontal joint, its fold joined to a stiff ring member and its downwardly projecting apex disposed substantially coaxial with both said shells and the said unit, with a substantial portion of the said unit disposed within said reentrant portion of said filter, and with means of agitating the said ring for shaking the filter comprising a yieldable member joined to the said ring on the upper side of said filter and exerting energy upward.

6. In a vacuum-cleaner, a lower shell for receiving accumulated dirt and having an air inlet, an upper shell joined to the lower shell along a continuous air-tight, substantially circular, horizontal joint, said upper shell supporting therein a motor-driven-air-impelling-unit and having an air outlet for same, a conical reentrant filter with its base joined to the upper shell in an air-tight manner adjacent said horizontal joint, its fold joined to a stiff ring member and its downwardly projecting apex disposed substantially coaxially with both said shells and the said unit, an air inlet at the center and bottom of said motor-unit and with a substantial portion of said unit disposed within the said reentrant portion of said filter, said unit comprising an inverted-cone-shaped case and having an air inlet at the bottom, and means of holding the filter free from said inlet.

7. In a vacuum-cleaner, a lower shell for receiving accumulated dirt and having an air inlet, an upper shell joined to the lower shell along a continuous air-tight, substantially circular, horizontal joint, said upper shell supporting therein a motor-driven-air-impelling-unit and having an air outlet for same, a conical reentrant filter with its base joined to the upper shell in an air-tight manner adjacent said horizontal joint, its fold joined to a stiff ring member and its downwardly projecting apex disposed substantially coaxially with both said shells and the said unit, a substantial portion of said unit disposed within the said reentrant portion of the filter, said unit comprising an inverted-cone-shaped case and having an air inlet at the bottom, the lower portion of said case depending into and substantially conforming with the reentrant portion of said filter, and means associated with said unit for holding said downwardly projecting reentrant portion of the filter substantially coaxial with the said case, free from the air inlet and positioned to permit the free flow of air between the said case and said filter when seeking the inlet to said fan.

8. The device described in claim 4, further characterized by having means joined to said ring for shaking said filter and with the same means agitable by a handle disposed outside the cleaner.

9. The device described in claim 4, further characterized by having means for agitating said filter joined to an external manually operable handle.

10. The device described in claim 7, further characterized by having means of agitating the ring by means of a bow joined thereto, which is also joined through the wall of the cleaner to an external manually operable handle.

11. In a vertical-axis canister-type suction-cleaner, a motor-suction-unit, a reentrant-cone-shaped dust-separator with a ring-member joined to the fold thereof, resilient means exerting force upward on said ring-member for holding said dust-separator in its operating position, control means for extending said resilient means and moving said ring out of normal position, said means comprising a manually operable handle joined to a hinged bow, and tie members extending between the supporting ring-member and the tips of said bow, with said motor-suction-unit disposed between said tie members.

12. In a vertical-axis canister-type suction-cleaner, an outer casing comprising a top case and a dirt-receiving-chamber at the bottom in communication with a cleaning hose, a reentrant-cone-shaped filtering-element disposed above and forming the top of said chamber, said element joined at its fold to a ring member, a spring attached to said ring member to hold such filter in its operating position, a motor-suction-unit disposed above said element and partially within the reentrant portion thereof, a depressable handle joined to the top of said top case, and means joined between said handle and said ring member for purposes of shaking the said filtering-element, said means comprising two rigid tie members extending vertically on opposite sides of the said motor-unit joined together at the top by a third rigid member which is operably joined to said depressable handle.

WARD LEATHERS.